3,322,698
CELLULAR URETHANES
Robert A. Wiles and Edward R. Degginger, Syracuse, N.Y., assignors to Allied Chemical Corporation, New York, N.Y., a corporation of New York
No Drawing. Filed Nov. 1, 1962, Ser. No. 234,841
6 Claims. (Cl. 260—2.5)

The present invention relates to a new class of cellular urethanes (urethane "foams"). More particularly, the invention relates to new rigid cellular urethanes comprising the reaction products of organic polyisocyanates and polyethers derived from epihalohydrins and to processes for the production thereof.

Rigid cellular urethane structures have been prepared by reacting organic polyisocyanates and active hydrogen-containing materials in the presence of blowing agents. The hydrogen-containing materials are generally polyesters or polyethers. Polyesters are not only relatively expensive but, in addition, are inherently hydrolyzable and, hence, fail to possess sufficient water resistance. Urethane structures derived from polyethers are quite flammable and attempts to overcome this deficiency by the addition of known fire retardant materials, while successful from the standpoint of fire retardancy, have adversely affected one or more other desirable physical properties of the resulting structure, e.g., dimensional stability, compressive strength, flexural strength, thermal conductivity, foam structure (i.e. size and proportion of closed cells) and the like.

Fire retardant urethane foams have been produced by the use of halogen and/or phosphorus-containing compounds, such as tris(chloroethyl) phosphate, chlorinated biphenyls, halogenated hydrocarbons, etc. These materials, being non-reactive, do not enter into the polymer reaction, and the resulting products, while being less flammable, have poor dimensional stability and other physical properties.

It has been suggested to employ polyhydroxy compounds containing halogen and/or phosphorus to produce fire retardant urethane foams. However, the relatively low molecular weight and high proportion of reactive groups of such polyhydroxy compounds introduced process difficulties, including rapid reaction, high peak exotherm, etc., which lead to poor quality of the urethane product.

An object of the present invention is to provide new rigid cellular urethanes.

Another object of the invention is to provide new rigid cellular urethanes comprising the reaction products of organic polyisocyanates and polyethers derived from epihalohydrins.

A further object of the invention is to provide simple and economical processes for producing the new rigid cellular urethanes.

Other objects and advantages of the invention will be apparent from the following description and examples.

The selection of polyethers which are suitable for the production of rigid urethane foams involves a number of known considerations of which the following are the most significant:

(1) Rigid urethane foams of satisfactory physical properties are generally produced from polyethers having an intermediate molecular weight in the range of about 500 to 1000. Polyethers of lower molecular weight tend to result in urethane products which are too brittle and do not have the desired strength (resistance to shock, abrasion, etc.). Higher molecular weight polyethers tend to result in softer and more flexible urethane products which do not possess the desired degree of rigidity.

(2) Polyethers used in preparing rigid urethane foams should have a functionality greater than two. The greater the functionality, the less linear is the resulting polymer and the greater the degree of cross-linking. Diols having a functionality of two lead to linear polymers which are highly flexible, while polyols having a functionality greater than two will lead to less flexible more rigid foams. The degree of rigidity depends primarily on the completeness of the reaction of the hydroxyl groups and the completeness of the cross-linking reaction. The cross-linking reaction can be assisted by "curing" procedures well-known in the art.

(3) The speed of reaction of the polyisocyanate and polyether depends partly on the nature of the polyether. In the manufacture of cellular polymers in which cell formation preceeds simultaneously with polymerization, it is necessary to correlate a number of process conditions. Thus, development of the required blowing agent, e.g. by reaction of water and polyisocyanate or by vaporization of an inert low-boiling liquid by heat supplied from the exothermic polymerization reaction should occur at a rate such that the polymerization mass is capable of withstanding the pressure developed by the blowing agent. Should the polymerization occur too fast and thus gel before the foam has reached its maximum height or conversely should the polymerization occur too slowly and the polymer not possess sufficient strength to contain the blowing agent, poor quality results. Although both high and low reactivity can, to some extent, be overcome by the proper selection and use of catalysts or accelerators, a number of other factors, many of which are unpredictable, are involved in the determination of the suitability of a particular polyether and even in the behavior of the polyether in a particular formulation.

We have now made the discovery that rigid cellular urethanes can be prepared by reacting in the presence of a blowing agent an organic polyisocyanate and a polyether derived from the reaction of an epihalohydrin and at least one polyol having the formula

wherein $n$ is an integer from 1 to 4. The cellular urethanes so produced possess excellent physical properties and are characterized by a high degree of flame retardancy.

That cellular urethanes of such excellent characteristics may be obtained from polyethers derived from epihalohydrins was indeed unexpected. It is well known that vicinal halohydrins are extremely sensitive to alkaline reagents and are readily dehydrohalogenated thereby to oxirane compounds as indicated by the following equation

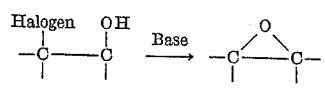

It would therefore have been reasonable to predict that polyethers derived from epihalohydrins, when mixed with alkaline catalysts conventionally used in forming cellular urethanes, would have been dehydrohalogenated with attendant loss of fire retardancy.

A wide variety of polyisocyanates and prepolymers thereof may be used in preparing the cellular urethanes of our invention. Liquid organic polyisocyanates and especially liquid aromatic diisocyanates are preferred. Among examples of suitable polyisocyanates are the following:

m-phenylene diisocyanate
2,4-tolylene diisocyanate
2,6-tolylene diisocyanate
naphthalene-1,5-diisocyanate
methylene-bis(4-cyclohexylisocyanate)
methylene-bis(4-phenylisocyanate)
1,6-hexamethylene diisocyanate 4,4',4"-triphenylmethane triisocyanate
1,3,5-benzene triisocyanate Mixtures of the above polyisocyanates and equivalent compounds or compositions may also be used in our invention. In addition, quasi prepolymers are preferably fluid prepolymers based on the polyisocyanates can be employed. It is known to prepare reactive prepolymers of a polyisocyanate and an active hydrogen-containing material such as a polyol, said prepolymer containing one or the other active component in excess and being capable of further reaction with a material having reactive groups of the type contained in the component used in lesser equivalent quantity. Preferably, a quasi prepolymer containing an excess of reactive isocyanate groups is used, and as the active hydrogen-containing material a polyether derived from an epihalohydrin and a polyol, e.g. sorbitol, glycerine and mixtures thereof, is used.

The polyethers which are suitable in the processes of our invention are the reaction products of an epihalohydrin, e.g. epifluorohydrin, epichlorohydrin or epibromohydrin, in the presence of an acidic fluorine-containing catalyst, e.g. fluoboric acid, and at least one polyol having the formula $$HOCH_2-(CHOH)_n-CH_2OH$$

wherein $n$ is an integer from 1 to 4. The polyether generally possesses a hydroxyl number of at least about 100, generally in the order of about 350 to 600 and preferably between about 400 and 550, has a functionality greater than two and is characterized by containing the group $$-CH-(CH_2X)-CH_2-O-$$

wherein X is fluorine, chlorine or bromine. The polyether generally contains the aforementioned group in ratio of about 0.5 to 6, preferably about 0.7 to 1.5, times the number of hydroxyl groups in the polyol used to prepare the polyether. The preparation of such polyethers is disclosed in U.S. Patent 2,260,753 of Oct. 28, 1941.

The preferred polyethers are those prepared by reacting an epihalohydrin with a mixture of two polyols in which one of the polyols is a 5 or 6 carbon atom sugar alcohol, e.g. sorbitol, mannitol, etc., and the other polyol is a triol, e.g. glycerine, trimethylolpropane, hexane triol, etc. The triol may be substituted by a diol or triol moiety such as the radical derived from ethylene glycol, diethylene glycol and the halogenated derivatives thereof such as glycerin chlorohydrin (1,2-dihydroxy-3-chloropropane). A portion of the triol may also be substituted by a phosphorus acid such as ortho phosphoric acid.

Particularly outstanding rigid cellular urethanes are produced by use of polyethers derived by reacting an epihalohydrin with a mixture comprising about 80 to 30 equivalent percent of the sugar alcohol and about 70 to 20 equivalent percent of the triol. In such instance where the polyether contains phosphorus, from about 0.3 to 2.5 percent by weight of the polyether should consist of combined phosphorus.

Suitable blowing agents are well-known in the art, but we prefer to use a low-boiling fluorinated aliphatic saturated hydrocarbon. Examples of these blowing agents include:

trichloromonofluoromethane
dichlorodifluoromethane
monochlorotrifluoromethane
dichloroetetrafluoroethane
tetrachlorodifluoroethane
1,1-difluoroethane
1,1,1-monochlorodifluoroethane Mixtures of these compounds and equivalent compounds may also be used in our invention.

The blowing agents are characterized by being liquids or gases at normal temperatures and pressures, having poor solvent power for the organic polymer and boiling at or below temperatures generated by the polymerization reaction, usually not in excess of about 175° C. The agents preferably have significant solubility in the polyisocyanate component and, when in the gaseous state, have a molecular size such that they do not diffuse readily through the interstices of the polymer molecules at ambient temperatures. The amount of blowing agent may vary from about 2% up to 40% or more by weight of the polyether.

The polymerization mixtures of the present invention may and usually do contain ingredients other than the above-indicated polyisocyanates, polyethers and blowing agents. Thus adjuvants such as emulsifiers, polymerization catalysts, accelerators or activators, pigments, fillers, extenders, auxiliary fire retardant agents and the like can be and usually are present.

The catalyst, accelerator or activator is used to promote or otherwise regulate the reaction between the polyisocyanate and the polyether. Tertiary amines such as triethylamine, dimethylethanolamine, pyridine, quinoline, N-alkyl morpholines and the like are conventionally used. Tin salts such as dibutyl tin dilaurate, tributyl tin octanoate, bis-(2-ethylhexyl)tin oxide, dibutyl tin dichloride, tin hexanoate, stannous octoate and the like may be used alone or in conjunction with the above-described tertiary amines. The amount of catalyst used may range from about 2 to 12 percent or more by weight based on the weight of the polyether. The catalyst can be introduced at any desired time although it is generally added to the polyether component prior to reaction thereof with the polyisocyanate component.

If desired, emulsifying agents may be used to improve the intermixing of the polyether and polyisocyanate components which are usually mutually insoluble. The polymerization reaction may be assisted by vigorous agitation and also by use of these emulsifying agents. Any of a number of known emulsifying agents can be used. We prefer, however, to employ siloxane-oxyalkylene block copolymers which have the general formula $$R'-Si\begin{matrix}O-(R_2SiO)_p-(C_nH_{2n}O)_zR''\\O-(R_2SiO)_q-(C_nH_{2n}O)_zR''\\O-(R_2SiO)_r-(C_nH_{2n}O)_zR''\end{matrix}$$

in which R, R' and R" are $C_{1-8}$ alkyl radicals, $p$, $q$ and $r$ are integers ranging from 2 to 15 and $-(C_nH_{2n}O)_z-$ is a polyalkylene block which is preferably a polyoxyethylene-polyoxypropylene block containing from 10 to 50 of each oxyalkylene unit. These siloxane-oxyalkylene block polymers are commercially available, one such being marketed under the trade designation "Silicone L-520" in which, referring to the general formula above, R=CH$_3$, R'=C$_2$H$_5$, R"=C$_4$H$_9$, $p$, $q$ and $r$=7 and the block $(C_nH_{2n}O)_z$ is a polyoxyethylene-polyoxypropylene block containing 50 units of each oxyalkylene moiety. Other emulsifying agents suitable for use in the invention include polyethylene phenol ether, blends of polyalcohol carboxylic acid esters, oil-soluble sulfonates and the like.

If desired, the flame retardancy of the cellular urethane products of this invention can be implemented by use of known flame retardant agents. Such agents, as is known, may or may not contain groups which are reactive with polyisocyanates. In the former instance, the amount polyisocyanate used should be adjusted to accommodate the reactive group. Representative of these fire retardants are:

(1) Non-reactive agents:
 antimony trioxide
  tris(chloroethyl) phosphate
  tris(2,3-dichloropropyl) phosphate
  tris(2,3-dibromopropyl) phosphate
  bis-beta chloroethyl vinyl phosphate (2) Reactive agents:
chlorinated diphenol
2-hydroxyethyl phosphite The polymerization ingredients and additives of the present invention can be mixed in various ways depending upon the type product desired. Generally the polyether together with catalyst, emulsifying agent and other adjuvants are premixed and then added together with a solution of the polyisocyanate and blowing agent to a mixing apparatus. The amount of polyether and polyisocyanate employed may vary over a wide range. Preferably the polyether is reacted with an amount in excess of an equimolar quantity of the polyisocyanate. If desired, the blowing agent can be introduced into the "premix" rather than the polyisocyanate. Further, the polyisocyanate can be prereacted with a portion of the polyether to form a quasi prepolymer. The latter is added to a premix comprising the balance of the polyether and other adjuvants. The mixture is thoroughly agitated, preferably at room temperature, to insure the blending of the reactants and is then poured or otherwise introduced into a suitable mold and permitted to foam freely therein. The foam is then allowed to set at ambient temperature or "cured" by placing the foam in a heated enclosure for a predetermined period dependent upon the requirements of the particular system employed.

Our invention will be further illustrated by the following examples which include typical modes of practicing the invention. Parts and percentages are by weight and temperatures are given in degrees centigrade unless otherwise specified.

EXAMPLE 1

A. *Preparation of polyether derived from epichlorohydrin*

A mixture of 584.85 parts of glycerin and 622.99 parts of sorbitol was agitated and heated to 80–90°, whereupon 4.96 parts of fluoroboric acid were added. Thereafter, 3785.96 parts of epichlorohydrin were added at a rate such that the temperature of the reaction mass was held at 86–89°. When the addition was completed, the mass was allowed to cool to about 25° over a 20 hour period. The mass was then warmed to 40–60° and partly neutralized by addition of 3.5 parts of triethanolamine. The product was obtained in yield of 4998 parts, had a hydroxyl number of 450 and viscosity of 60,800 centipoises (c.p.s.) at 24.5°. This polyether possessed the following composition:

| Polyol | Mol. Percent | Percent Equivalent | Weight Percent | Mol. Weight |
|---|---|---|---|---|
| Diol | 1.39 | 0.69 | 0.74 | 266.84 |
| Triol | 64.09 | 47.86 | 47.86 | 375.20 |
| Hexol | 34.52 | 51.50 | 51.41 | 748.38 |

The polyether had an average functionality of about 4.5 and contained the group $$CH-(CH_2Cl)-CH_2-O-$$

in ratio of about 1.1 times the number of hydroxyl groups in the glycerine and sorbitol.

B. *Preparation of polyether containing phosphorus derived from epichlorohydrin*

A mixture of 517.5 parts of glycerine, 551.4 parts of sorbitol and 189.6 parts of 100% phosphoric acid was heated to 85°, and 5.0 parts of 50% fluoroboric acid were added. The reaction mixture was maintained between 86° and 92° and 3858.4 parts of epichlorohydrin were added. This addition required 2½ hours, and the mixture was permitted to stand for 2 hours thereafter. The reaction mass was neutralized by the addition of 5.0 parts of triethanolamine. The resulting polyether had a hydroxyl number of 450, an acid number of 2.9 and a viscosity at 25° of 31,000 c.p.s. The polyether contained the group $$CH-(CH_2Cl)-CH_2-O-$$

in ratio of about 1.2 times the hydroxyl groups in the glycerine and sorbitol.

EXAMPLE 2

A series of cellular urethane foams differing only in the content of antimony trioxide was prepared using the following formulation:

160 parts of a quasi-prepolymer having an amine equivalent of 147 and a viscosity of 4620 cps. at 25° and prepared by heating 1910 parts of a polyether prepared as described in Example 1A and 6080 parts of an 80–20 mixture of 2,4- and 2,6-tolylene diisocyanates at about 80° for about 3 hours.

133 parts of a polyether prepared as described in Example 1A.

1 part of siloxane-oxyalkylene block copolymer.
1 part of dibutyl tin dilaurate.
1 part of dimethylethanolamine.
65 parts of trichloromonofluoromethane.

Four foams were prepared containing 0, 1, 2 and 4 parts of antimony trioxide, respectively. Each mass was vigorously agitated for several seconds, poured into a suitable mold and allowed to foam freely. The foam was permitted to stand at ambient temperature for about 16 hours. The properties of the resultant foams are set forth in Table I below:

TABLE I

| Property | Foam containing indicated parts of antimony trioxide | | | |
|---|---|---|---|---|
| | 0 | 1 | 2 | 4 |
| Density, lb./cu. ft. | 1.5 | 1.4 | 1.5 | 1.4 |
| Compression load: | | | | |
| Yield point (p.s.i.) | 16.5 | 16.0 | 15.5 | 14.0 |
| 10% Deflection (p.s.i.) | 20.5 | 18.5 | 18.0 | 17.0 |
| Flammability (ASTM 1692-D57T): | | | | |
| Burning Rate (in./min.) | 3.9 | 3.1 | 2.6 | 2.8 |
| Extinguishing Time (sec.) | 60.8 | 75.5 | 26.5 | 9.5 |
| Inches Burned | 4.0 | 3.9 | 1.13 | 0.44 |
| Self-Extinguishing | No | No | Yes | Yes |

EXAMPLE 3

A series of foams were prepared using the following formulation:

*Premix*

100 parts of polyether prepared as described in Example 1A.
8.3 parts of pentakis(hydroxypropyl)diethylenetriamine.
1 part siloxane-oxyalkylene block copolymer.
0.4 part dibutyl tin dilaurate.
0.4 part of dimethylethanolamine.
Antimony trioxide (amount as indicated below in Table II).

*Isocyanates*

81.7 parts of an 80–20 mixture of 2,4- and 2,6-tolylene diisocyanates.
35.0 parts of trichloromonofluoromethane.

The components of the "premix" were thoroughly blended and to it was added a solution of the isocyanates and blowing agent. The mass was vigorously agitated for about 15 seconds, poured into a suitable mold and allowed to foam freely. The foam was permitted to stand at ambient temperature for about 16 hours. The properties of the resultant foams are given in Table II below:

TABLE II

| Property | Foam containing indicated parts of antimony trioxide | | | |
|---|---|---|---|---|
| | 0 | 1 | 2 | 4 |
| Density (lb./cu. ft.) | 1.5 | 1.7 | 1.5 | 1.6 |
| Compression Load: | | | | |
|   Yield Point (p.s.i.) | 15.0 | 16 | 14 | 15 |
|   10% Deflection (p.s.i.) | 17.5 | 16.5 | 15.5 | 17 |
| Flammability (ASTM D-1692-57T): | | | | |
|   Burning Rate (in./min.) | 4.3 | 3.9 | 2.9 | 2.3 |
|   Extinguishing Time (sec.) | 55.3 | 45.5 | 15.5 | 5.5 |
|   Inches Burned | 4.0 | 2.94 | 0.75 | 0.21 |
|   Self-Extinguishing | No | Yes | Yes | Yes |

EXAMPLE 4

The foams prepared in Examples 2 and 3 were compared with a similar series of urethane foams prepared as described in Example 3 in which the polyether was replaced with 100 parts of a propylene oxide condensation product with glycerin having a hydroxyl number of 380. Because of the lower functionality of this polyether, i.e., 3, the amount of diisocyanates was correspondingly reduced from 81.7 parts to 70.3 parts.

The properties of this series of foams are reproduced in Table III below:

TABLE III

| Property | Foam containing indicated parts of antimony trioxide | | | |
|---|---|---|---|---|
| | 0 | 1 | 2 | 4 |
| Density (lbs./cu. ft.) | 1.56 | 1.53 | 1.62 | 1.42 |
| Compression Load: | | | | |
|   Yield Point (p.s.i.) | 17 | 17.5 | 15.5 | 14 |
|   10% Deflection (p.s.i.) | 17.5 | 15.5 | 14.0 | 13 |
| Flammability (ASTM D-1692-57T): | | | | |
|   Burning Rate (in./min.) | 5.7 | 6.5 | 7.3 | 6.76 |
|   Extinguishing Time (sec.) | 42 | 37 | 33 | 35.5 |
|   Inches Burned* | 4 | 4 | 4 | 4 |
|   Self-Extinguishing | No | No | No | No |

*Entire test piece consumed.

It is apparent from the above results that the urethane foams derived from the polyethers of this invention when ignited burn at a slower rate than those prepared from conventional polyethers. Even the addition of a known fire retardant, i.e., antimony trioxide, fails to reduce the flammable character of the latter foams, whereas the foams of this invention are surprisingly self-extinguishing.

EXAMPLE 5

A series of foams were prepared using the following formulation:

Premix 100 parts of the polyether prepared in Example 1A.
0.42 part of dimethylethanolamine.
0.42 part of dibutyl tin dilaurate.
8.3 parts of pentakis (hydroxypropyl)diethylenetriamine.
1.0 part of siloxane-oxyalkylene block copolymer.
2.0 parts of antimony trioxide.
35.0 parts of trichloromonofluoromethane.

The components of the "premix" were agitated vigorously to obtain a homogeneous mixture to which were added 110.7 parts of a mixture of crude 2,6- and 2,4-tolylene diisocyanates having an amine equivalent of 106.4. The resulting mass was agitated vigorously for 30 seconds and then allowed to reach full height and to stand for about 16 hours.

The resultant foam had a fine uniform cell structure, a density of 2.3 lbs. per cubic foot and a compressive strength (at 10% deflection) of 36 p.s.i. Dimensional stability tests gave the following results:

24 hours at 70° _____ No change.
24 hours at 110° _____ 3% expansion.
3 days at 38° and 90–100% relative humidity _____ No change.
24 hours at 70° and 90–100% relative humidity _____ 8% expansion.

EXAMPLE 6

A urethane foam was prepared using the following formulation:

Premix 100 parts of epichlorohydrin-sorbitol-glycerin polyether having a viscosity of 60,000 centipoises at 25.5° and a hydroxyl number of 450, prepared as described in Example 1A.
0.40 part of dimethylethanolamine.
0.60 part of stannous octoate.
0.2 part of antioxidant.
8.4 parts of pentakis(hydroxypropyl)diethylenetriamine.
2.0 parts of antimony oxide.
1.0 part of siloxane-oxyalkylene block copolymer.

The components of the "premix" were thoroughly blended and then mixed with a solution of 40 parts of trichloromonofluoromethane and 106 parts of a mixture of crude 2,6- and 2,4-tolylene diisocyantes having an amine equivalent of 106.4. The mixture was agitated for about 20 seconds, poured into a suitable mold and permitted to foam freely to reach full height. The product was set aside to stand at ambient temperature for about 16 hours.

The resulting foam product had a fine uniform cell structure, a density of 1.9 lbs. per cubic foot and a compressive strength (10% deflection) of 31 p.s.i. The following results were obtained when the product was subjected to dimensional stability tests:

24 hours at 70° _____ 1–2% shrinkage.
24 hours at 110° _____ 3–4% shrinkage.
24 hours at −30° _____ No change.
3 days at 38° and 90–100% relative humidity _____ 0.5% expansion.
24 hours at 70° and 90–100% relative humidity _____ 8% expansion.

The foam product had a flexural strength of 28.9 p.s.i. and contained 98% closed cells. The thermal conductivity factor was initially 0.127 B.t.u./hr./sq. ft./° F./in. After aging the foam product for 7 days at 63°, the product had a thermal conductivity factor of 0.135 B.t.u./hr./sq. ft./° F./in. The foam was self-extinguishing.

EXAMPLE 7

A foam was prepared using the following formulation:

Premix 100 parts of an epichlorohydrin-sorbitol-glycerin polyether having a hydroxyl number of 400 and a viscosity of 59,500 cps. at 24.5°, prepared as described in Example 1A.
0.45 part of dimethylethanolamine.
0.45 part of dibutyl tin dilaurate.
8.33 parts of pentakis(hydroxypropyl)diethylenetriamine.
1.0 part of siloxane-oxyalkylene block copolymer.
2.0 parts of antimony trioxide.
37 parts of trichloromonofluoromethane.

The "premix" was mixed well and to it were added 104 parts of a mixture of crude 2,6- and 2,4-tolylene diisocyanates having an amine equivalent of 106.4. The resulting mass was agitated vigorously for 30 seconds, poured into a suitable mold and permitted to foam therein to its full height.

After standing for 24 hours at ambient temperature, the foam possessed the following properties:

| Density | 2.37 lb./cu. ft. |
| --- | --- |
| Flammability (ASTM D-1692-57T) | Self-extinguishing. |
| Compressive strength (10% deflection) | 21 p.s.i. |
| Dimensional stability (percent change): | |
| 24 hours at 70° | 0.57. |
| 24 hours at 100° | 9.8. |
| 24 hours at −30° | 0.72. |
| 24 hours at 70° and 90–100% relative humidity | 16.3. |
| 3 days at 38° and 90–100% relative humidity | 2.2. |

EXAMPLE 8

In a similar manner to that described in Example 7, a rigid cellular urethane foam was prepared using the following formulation:

*Premix*

100 parts of an epichlorohydrin-sorbitol-glycerin polyether having a hydroxyl number of 450 and a viscosity of 39,000 cps. at 24.5°, prepared as described in Exampe 1A.
1 part of siloxane-oxyalkylene block copolymer.
0.45 part of dimethylethanolamine.
0.45 part of dibutyl tin dilaurate.
7.9 parts of pentakis(hydroxypropyl)diethylenetriamine.
45 parts of trichloromonofluoromethane.
105.8 parts of a mixture of crude 2,6- and 2,4-tolylene disocyanates having an amine equivalent of 106.4.

The resulting foam product had a uniform fine cell structure, a compressive strength (at 10% deflection) of 27 p.s.i., a density of 1.9 lbs. per cubic foot and was self-extinguishing.

EXAMPLE 9

A cellular urethane foam was prepared in the same manner as set forth in Example 7 using the following formulation:

120 parts of a polyether derived from epichlorohydrin-sorbitol-glycerin and phosphoric acid having a hydroxyl number of 450, prepared as described in Example 1B.
1.2 parts of siloxane-oxyalkylene block copolymer.
0.5 part of dimethylethanolamine.
0.5 part dibutyl tin dilaurate.
10.0 parts pentakis(hydroxypropyl)diethylenetriamine.
36.5 parts of trichloromonofluoromethane.
111 parts of a mixture of crude 2,6- and 2,4-tolylene diisocyanates having an amine equivalent of 105.3.

The resulting foam product had a density of 2.1 lbs. per cubic foot, a compressive strength (10% deflection) of 34.5 p.s.i. and was self-extinguishing.

EXAMPLE 10

A cellular urethane foam product was prepared in the manner described in Example 7 using the following formulation:

120 parts of a polyether derived from epichlorohydrin-sorbitol-glycerin and phosphoric acid having a hydroxyl number of 500, prepared as described in Example 1B.
1.2 parts of siloxane-oxyalkylene block copolymer.
0.5 part dimethylethanolamine.
0.5 part dibutyl tin dilaurate.
10.0 parts of pentakis(hydroxypropyl)diethylenetriamine.
39.1 parts of trichloromonofluoromethane.
128.8 parts of a mixture of crude 2,6- and 2,4-tolylene disocyanates having an amine equivalent of 105.3.

The resulting foam product had a density of 2.2 lbs. per cubic foot, a compressive strength at yield point of 33.5 p.s.i. and was self-extinguishing.

EXAMPLE 11

A cellular urethane foam was prepared in the manner described in Example 7 using the following formulation:

100 parts of polyether prepared as described in Example 1A.
1 part of siloxane-oxyalkylene block copolymer.
0.4 part of dimethylethanolamine.
0.4 part of dibutyl tin dilaurate.
8.33 parts of pentakis(hydroxypropyl)diethylenetriamine.
36.5 parts of trichloromonofluoromethane.
123 parts of crude methylene-bis(4-phenyl isocyanate) having an amine equivalent of 131.4.

The resulting foam product had a density of 1.9 lbs. per cubic foot, a compressive strength at the yield point of 26 p.s.i. and was self extinguishing.

The rigid urethane foams of this invention are ideally suited for insulation purposes, e.g. in roofing, piping and for refrigeration uses.

The invention has been illustrated by specific embodiments, but, as will be obvious to those skilled in the art, the details thereof may be varied widely without departing from the scope or spirit of our invention. For example, the blowing agent may be internally generated, as is the case with carbon dioxide generated during reaction of the epihalohydrin reaction product with polyisocyanate in the presence of water.

We claim:

1. A rigid cellular urethane prepared by reacting in the presence of a blowing agent an organic polyisocyanate and a polyether derived from the reaction of an epihalohydrin and a polyol having the formula $$HOCH_2-(CHOH)_n-CH_2OH$$

wherein $n$ is an integer from 1 to 4, said polyether having a hydroxyl number of at least about 100 and being characterized by containing the group $$-CH-(CH_2X)-CH_2-O-$$

wherein X is a member selected from the group consisting of fluorine, chlorine and bromine, said group being present in a ratio of about 0.5 to 6 times the number of hydroxyl groups present in said polyol, a portion of said polyl being substituted by orthophosphoric acid.

2. A rigid cellular urethane prepared according to claim 1 wherein the polyol is a mixture of a sugar alcohol containing 5 to 6 carbon atoms and a triol, a portion of the triol being substituted by orthophosphoric acid.

3. A rigid cellular urethane prepared according to claim 2 wherein the polyether contains from about 0.3 to 2.5% by weight of combined phosphorus.

4. A process for the preparation of a rigid cellular urethane which comprises reacting in the presence of a blowing agent an organic polyisocyanate and a polyether derived from the reaction of an epihalohydrin and a polyol having the formula $$HOCH_2-(CHOH)_n-CH_2OH$$

wherein $n$ is an integer from 1 to 4, said polyether having a hydroxyl number of at least about 100 and being characterized by containing the group $$-CH-(CH_2X)-CH_2-O-$$

wherein X is a member selected from the group consisting of fluorine, chlorine and bromine, said group being present in a ratio of about 0.5 to 6 times the number of hydroxyl groups present in said polyol, a portion of said polyol being substituted by orthophosphoric acid.

5. The process of claim 4 wherein the polyol is a mixture of a sugar alcohol containing 5 to 6 carbon atoms and a triol, a portion of the triol being substituted by orthophosphoric acid.

6. The process of claim 5 wherein the polyether contains from about 0.3 to 2.5% by weight of combined phosphorus.

(References on following page)

References Cited

UNITED STATES PATENTS

| | | | |
|---|---|---|---|
| 2,581,464 | 1/1952 | Zech | 260—348 |
| 3,054,756 | 9/1962 | Holtschmidt et al. | 260—2.5 |
| 3,054,760 | 9/1962 | Worsley et al. | 260—2.5 |
| 3,055,845 | 9/1962 | Merten et al. | 260—2.5 |
| 3,092,651 | 6/1963 | Friedman | 260—461 |
| 3,099,676 | 7/1963 | Lanham | 260—461 |
| 3,219,634 | 11/1965 | Watson et al. | 260—77.5 |
| 3,260,687 | 7/1966 | Postol | 260—2.5 |

DONALD E. CZAJA, *Primary Examiner.*

LEON J. BERCOVITZ, *Examiner.*